(12) United States Patent
Low et al.

(10) Patent No.: US 8,332,821 B2
(45) Date of Patent: Dec. 11, 2012

(54) USING ENCODING TO DETECT SECURITY BUGS

(75) Inventors: Spencer Wong Low, Redmond, WA (US); Daniel W. Crevier, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 893 days.

(21) Appl. No.: 12/410,482

(22) Filed: Mar. 25, 2009

(65) Prior Publication Data
US 2010/0251216 A1 Sep. 30, 2010

(51) Int. Cl.
*G06F 9/44* (2006.01)
(52) U.S. Cl. .......................... 717/124; 717/125; 717/126
(58) Field of Classification Search .................. None
See application file for complete search history.

(56) References Cited

U.S. PATENT DOCUMENTS

| | | | |
|---|---|---|---|
| 6,112,049 A | 8/2000 | Sonnenfeld | |
| 7,210,066 B2 | 4/2007 | Mandava et al. | |
| 7,313,564 B2 * | 12/2007 | Melamed et al. | 717/124 |
| 7,849,448 B2 * | 12/2010 | Yunus et al. | 717/126 |
| 7,870,535 B2 * | 1/2011 | Rippert et al. | 717/125 |
| 7,870,610 B1 * | 1/2011 | Mitchell et al. | 726/23 |
| 8,196,112 B1 * | 6/2012 | Cansizlar | 717/124 |
| 2002/0156688 A1 * | 10/2002 | Horn et al. | 705/26 |
| 2003/0227480 A1 | 12/2003 | Polk | |
| 2004/0107415 A1 * | 6/2004 | Melamed et al. | 717/124 |
| 2005/0149726 A1 * | 7/2005 | Joshi et al. | 713/164 |
| 2006/0143195 A1 * | 6/2006 | Ornstein et al. | 707/100 |
| 2006/0259898 A1 | 11/2006 | Reinhardt | |
| 2007/0074169 A1 * | 3/2007 | Chess et al. | 717/124 |
| 2007/0074188 A1 * | 3/2007 | Huang et al. | 717/126 |
| 2008/0059189 A1 | 3/2008 | Stephens | |
| 2008/0301431 A1 * | 12/2008 | Hea | 713/150 |
| 2011/0131552 A1 * | 6/2011 | Chen et al. | 717/125 |
| 2011/0197180 A1 * | 8/2011 | Huang et al. | 717/126 |

OTHER PUBLICATIONS

Meier et al., "How to: Prevent Cross-Site Scripting in ASP.NET", May 2005, Microsoft Corporation, pp. 1-12 <http://msdn.microsoft.com/en-us/library/ff649310.aspx>.*
Jim et al., "Defeating Script Injection Attacks with Browser-Enfored Embedded Policies", May 8, 2007, ACM, pp. 601-610 <http://dl.acm.org/citation.cfm?id=1242654>.*
Petukhov et al., "Detecting Security Vulnerabilities in Web Applications Using Dynamic Analysis with Penetration Testing", OWASP, Application Security Conference, May 18, 2008, Ghent, Belgium, pp. 1-16; <https://www.owasp.org/images/3/3e/OWASP-AppSecEU08-Petukhov.pdf >.*
Chen et al., "Security Vulnerabilities—From Analysis to Detection and Masking Technique", 2006 IEEE, vol. 94, No. 2, pp. 407-418; <http://ieeexplore.ieee.org/Xplore/dynhome.jsp?tag=1&tag=1>.*

(Continued)

*Primary Examiner* — Thuy Dao
*Assistant Examiner* — Ben C Wang

(57) ABSTRACT

A system that facilitates detecting security flaws in a web site that receives and transmits untrusted content is described herein. The system includes a receiver component that receives test content that corresponds to a field on a web page that, when the web site is online, is configured to receive user-generated content, wherein the test content includes non-malicious data. An encoder component encodes each character of the test content regardless of form or content of the test content to generate encoded content. A display component displays encoded content and non-encoded content of the web page to a tester on a computer screen, wherein the display component causes the encoded content to be displayed in a visually distinct manner from the non-encoded content.

20 Claims, 8 Drawing Sheets

OTHER PUBLICATIONS

Kals et al., "SecuBat—A Web Vulnerability Scanner", 2006 ACM, WWW 2006, May 23, 2006, Edinburgh, Scotland, pp. 1-10; <http://dl.acm.org/results.cfm?h=1&cfid=146514936&cftoken=29812214>.*

Buytaert Dries,"Over-Encoding e-mail Message Subjects", Retrieved at<<http://drupal.org/node/142488>>, May 9, 2007, pp. 2.

Mgiuca,"Message69535", Retrieved at<<http://bugs.python.org/msg69535>>, Nov. 7, 2008, pp. 4.

"Dynamic Forums DHTML Scripts for the Real World", Retrieved at<<http://www.dynamicdrive.com/forums/showthread.php?p=176425>>, Dec. 21, 2008, pp. 5.

"Help and FAQ for the Markup Validator", Retrieved at<<http://validator.w3.org/docs/help.html>>, Jan. 5, 2009, pp. 7.

Spier Robert,"A Canary Trap for URI Escaping", Retrieved at<<http://www.onlamp.com/pub/a/onlamp/2006/02/23/canary_trap.html>>, Feb. 23, 2006, pp. 4.

* cited by examiner

USING ENCODING TO DETECT SECURITY BUGS

BACKGROUND

Networking technologies have enabled individuals to nearly instantaneously communicate with one another. For instance, e-mail applications enable an individual to craft an e-mail and transmit it to an intended recipient in a matter of seconds. The recipient of the e-mail can access their e-mail inbox and can quickly retrieve and review the e-mail message.

Furthermore, networking technologies and browsers have enabled users to craft journals, often referred to as web logs or blogs, and post them on a particular web site that is hosted by a third party. Thus, an individual may provide commentary with respect current events, catharsis, descriptions of events in the individual's life, etc. in a forum where others can quickly view such information. In an example, an individual who desires to review a blog may enter a URL corresponding to the blog and be provided the blog in their Internet browser.

It can be discerned that third party sites that host e-mail applications, web log applications, or other applications are configured to display user-generated content in a format specified by the user. Thus, the user can specify styles, fonts, etc. pertaining to how content applications that can be used in connection with receiving and formatting user generated content. For instance a host of an e-mail application can receive an e-mail generated by a first individual (with specified formatting and styling) and can transmit such content to the browser of an intended recipient (with the specified formatting and styling). As such third party hosts accept user generated content and re-transmit such content, however, the hosts and/or end users may be subject to malicious attacks. For instance, an individual may attempt to insert malicious code into a web log such that reviewers of the web log may be subjected to the malicious code. Thus, developers of hosts that receive user generated content and other untrusted content attempt to insure that malicious code is not transmitted to end users.

SUMMARY

The following is a brief summary of subject matter that is described in greater detail herein. This summary is not intended to be limiting as to the scope of the claims.

Various technologies pertaining to encoding untrusted content, such as user-generated content, are described in detail herein. More specifically, various technologies pertaining to testing web sites to ensure that function calls to encoding algorithms are existent and operating correctly in a particular web site are described herein. Web pages may include one or more fields that are configured to receive user-generated content. For example, a web page corresponding to an e-mail application can include a field that can receive data pertaining to an intended recipient of an e-mail, data pertaining to a subject of an e-mail, data pertaining to content of the e-mail, etc. During a testing phase (prior to the e-mail application going live), test content can be injected into one or more of these fields. For instance, the test content may be pre-existent and inserted automatically into one or more of the fields. In another example, a tester may manually generate content and enter such content into a field that is configured to receive user-generated content.

Again, during the testing phase, when the test data is received in the web page and transmitted to the host application, a function call can be made to an encoding algorithm for at least one field of the web page. Responsive to receipt of the function call, the encoding algorithm can encode at least one uppercase alphabetical character (A-Z), at least one lowercase alphabetical character (a-z), and/or at least one numerical character (0-9) in the test content pertaining to the at least one field. In another example, the encoding algorithm can encode each character in the test content regardless of form or content thereof. The encoding algorithm may use any suitable encoding scheme when undertaking such encoding. For instance, the encoding algorithm can transform each character to a series of symbols, an ASCII equivalent value of a character, etc.

Once such test content has been encoded, the test content can be displayed to the tester. For instance, the raw output of the encoding algorithm can be reviewed by the tester, wherein the tester reviews the raw output by viewing the source code (e.g., HTML) in a web browser, for example. In accordance with another aspect, encoding can be undertaken in a manner that causes encoded content on the web page to be displayed in a manner that is visually distinct from non-encoded content. For example, an encoding function can be configured such that the encoding function causes encoded content to be displayed with glyphs above characters on a web page. In another example, an encoding function can be configured such that the encoding function causes encoded content to be displayed as bolded content on a web page. Thus, a reviewer of the web page can quickly ascertain that an encoding function has been correctly called for a particular field in the web page. If the testers, when reviewing the data pertaining to the at least one field of the web page, locate content that appears "normal," then the tester can determine that the encoding algorithm has not been properly called.

Other aspects will be appreciated upon reading and understanding the attached figures and description.

DETAILED DESCRIPTION

Figure 1:
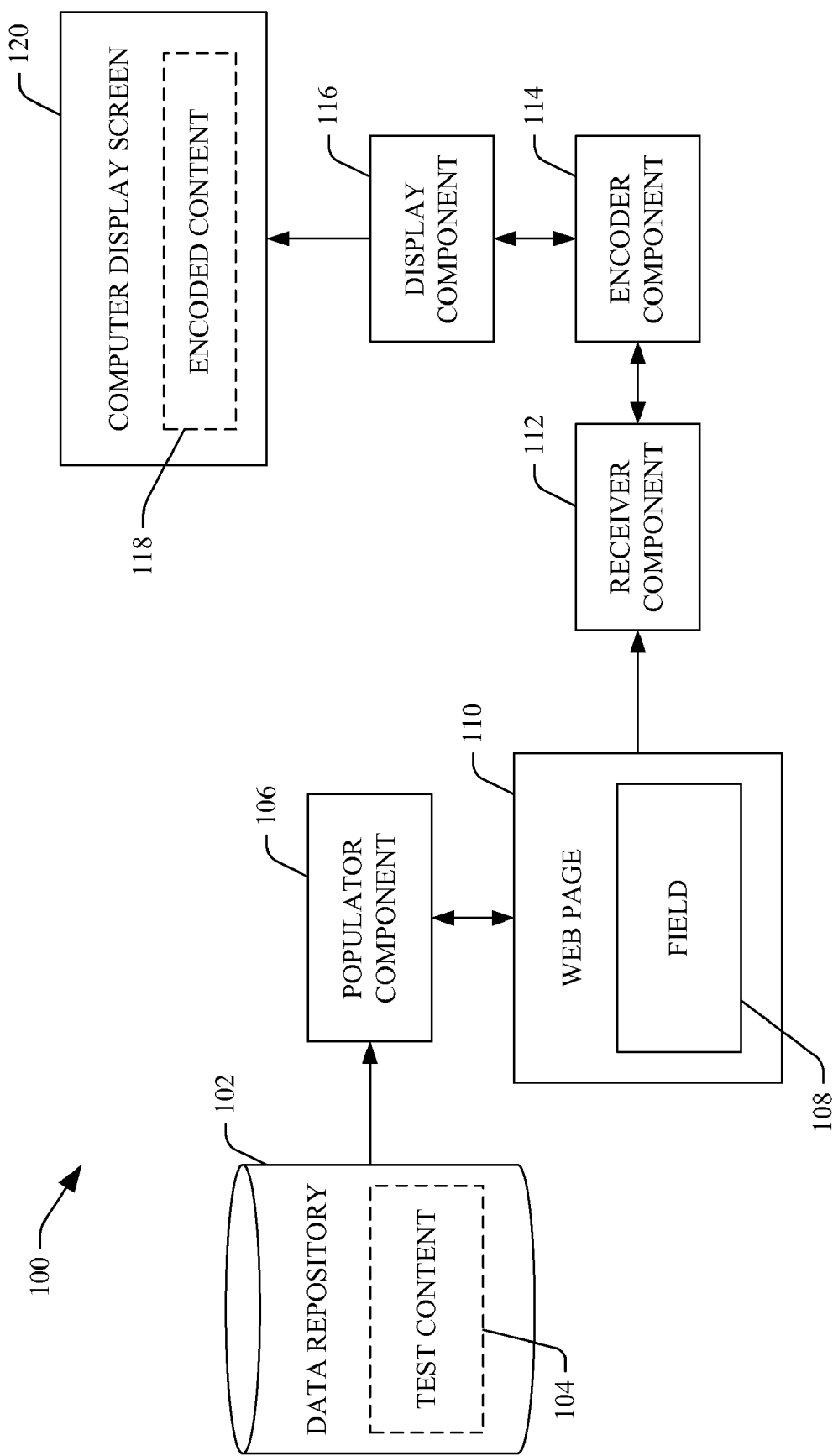
FIG. 1 is a functional block diagram of an example system that facilitates encoding test content.

Various technologies pertaining to encoding test content will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates encoding test content such that it is displayed to a tester in a visually distinctive manner from non-encoded content is illustrated. While the system 100 is described in connection with encoding HTML that corresponds to at least one field of a web page, it is to be understood that the system 100 can be adapted/configured to encode URL-encoded parameters, JavaScript string literals, HTML attributes, etc. Thus, the system 100 is merely provided as an example of one possible implementation of encoding test content.

The system 100 includes a data repository 102 that comprises test content 104, wherein the test content or portions thereof can be placed into fields of a web page that, when a web site corresponding to the web page is online (e.g., live), are configured to accept user-generated content. Thus, for example, if the system 100 is used in connection with testing a hosted e-mail application/web site, the test content 104 may be or include contents that can be populated into a "subject" field of an e-mail web page, a field indicating who has crafted the e-mail, a field indicating who is to receive the e-mail, a field that includes a message from the crafter of the e-mail to the intended recipient, etc. Thus, the test content 104 may be text strings, numerical strings, formatted text, code, etc. generated by a tester and/or automatically generated data.

The system 100 may optionally include a populator component 106 that can be configured to aid in connection with populating at least one field 108 of a web page 110 with at least a portion of the test content 104 in the data repository 102. Thus, for example, the populator component 106 can extract test content pertaining to a subject of an e-mail and populate the field 108 in the web page 110 with such test content. It is to be understood that actions described as being undertaken by the populator component 106 may be undertaken by a tester. For instance, the tester may access the web page 110 and manually populate the field 108 with test content.

The system 100 further includes a receiver component 112 that receives the web page 110, wherein the web page 110 includes test content in the field 108. For example, the web page 110 can be received as HTML code or content that can be used in connection with building the web page 110 or a related web page. An encoder component 114 can be in communication with the receiver component 112. The encoder component 114 can receive the web page 110 including the test content and can encode one or more characters in the test content regardless of character type, format, adjacent or proximate characters, etc. In an example, the test content may include at least one uppercase alphabetical character, at least one lowercase alphabetical character, and/or at least one numerical character, and the encoder component 114 can encode the at least one uppercase alphabetical character, the at least one lowercase alphabetical character, and/or the at least one numerical character. In another example, the encoder component 114 can encode each character in the test content regardless of form or content of such test content. Therefore, the test content need not include data particularly crafted by a tester to include certain tags or have a certain format, thereby allowing the tester to more easily locate bugs in an encoding function call or missing function calls.

The encoder component 114 may use any suitable encoding scheme in connection with encoding (transforming) the test content in the field 108 of the web page 110. For instance, the encoder component 114 may replace a character in the test content corresponding to the field 108 of the web page 110 with a symbol or series of symbols together with an ASCII value for an encoded character. Of course, other encoding schemes are also contemplated. Any encoding algorithm used by the encoder component 114 can effectively cause raw output of the encoding algorithm to be visually distinctive from test content input to the encoding algorithm.

The system 100 additionally includes a display component 116 that causes the test content encoded by the encoder component 114 to be displayed as encoded content 118 on a computer display screen 120. Thus, the display component 116 may be or include a web browser, a computer display screen, a general purpose processor, a graphics processor, a portion of a liquid crystal display screen or other suitable display screen, a function for reading encoded content and non-encoded content, some suitable combination thereof, or other hardware/software. In an example, the display component 116 can cause a web browser to be displayed on the computer display screen 120. A tester may then access the source HTML code (with the encoded content) by selecting a menu in the web browser, and the encoded content 118 can be displayed to the tester in the source HTML code. Thus, responsive to receipt of a command from the tester, source HTML code can be displayed to such tester.

In another example, and as will be described in greater detail herein, the encoder component 114 can encode the test content in such a way that the display component 116 renders encoded content on a web browser in a visually distinctive manner from non-encoded content. Thus, a tester need not access raw output of the encoder component 114 to determine whether or not content has in fact been encoded. By causing the encoded content 118 to be displayed on the computer display screen 120 in a visually distinctive manner from non-encoded content, the tester can quickly ascertain whether a function call that causes data pertaining to the field 108 to be encoded is operating properly (e.g., has been properly positioned and is bug free).

Furthermore, the tester can use any suitable test content in connection with determining whether a function call to an encoding algorithm is operating properly (e.g., the tester need not craft a specific type of test content to properly test the function call of the encoding algorithm). For instance, if the tester reviews raw output from the encoder component 114 and determines that the test content corresponding to the field 108 has not been encoded, then the tester can determine that a function call to an encoding algorithm is missing or has a bug. A function call may then be properly inserted and/or debugged, thereby addressing a possible security flaw corresponding to a web site that serves the web page 110 to users.

While the web page 110 was described as being a web page that facilitates receipt of e-mail data, it is to be understood that the web page 110 may be a web page that facilitates receipt and/or display of other untrusted content (e.g., user-generated data). For instance, the web page 110 may facilitate receipt and subsequent display of web log (blog) information. In another example, the web page 110 may facilitate receipt of user-generated comments with respect to a certain product or service. Thus, the web page 110 may be any suitable type of web page that is used in connection with an application that receives untrusted content and causes such content to be transmitted to another computing device (e.g., as a web page displayed in a web browser).

Figure 2:
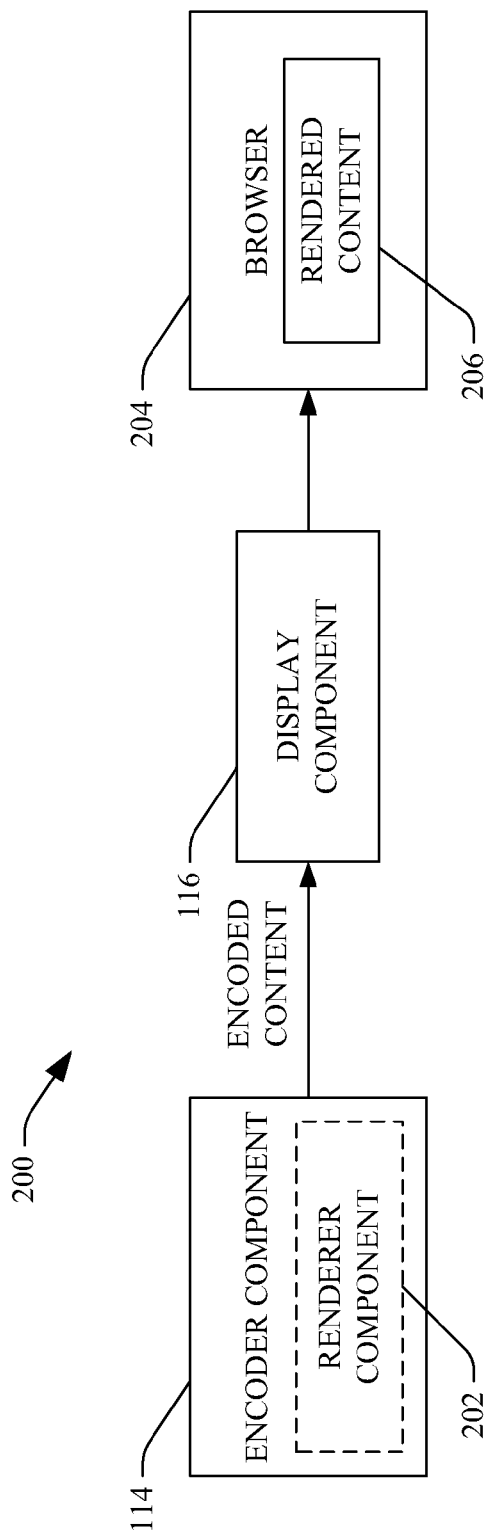
FIG. 2 is a functional block diagram of an example system that facilitates causing encoding contents to be rendered in a browser in a visually distinct manner from non-encoded content.

Referring now to FIG. 2, an example system 200 that facilitates rendering encoded test content in a browser is illustrated. The system 200 includes the encoder component 114 which, as described above, encodes test content. The field of the web page may be configured to receive untrusted content when a web site corresponding to the web page goes online—content that is inserted by an untrusted party that may attempt to inject malicious code into the field. Thus, the encoder component 114 can receive test content that corresponds to the field of the web page and encodes such test content to generate encoded content.

The encoder component 114 can comprise a renderer component 202 that can cause the encoder component 114 to encode the test content in such a way that, when displayed in a web page on a computer screen, the encoded content is visibly distinct from non-encoded content. In an example, the renderer component 202 can cause the test content to be encoded such that a web browser 204 displays rendered content 206 that can include encoded test content and non-encoded content.

As noted previously, the renderer component 202 can cause test content to be encoded in such a manner that encoded is displayed in a visually distinctive manner from non-encoded content in a web page. For instance, the renderer component 202 can encode the test content to cause glyphs to be displayed over each character that has been subjected to encoding by the encoder component 114. In another example, the renderer component 202 can encode the test content to cause encoded content to be displayed at a certain size with a certain font, certain color, highlighted, etc. Pursuant to an example, the renderer component 202 can cause test content to be encoded such that tags or other information is part of the encoding (e.g., during encoding, tags causing test content to be shown as bold on a web page are added). Such tags can cause the encoded content to be rendered in a particular manner in the browser 204 that is visually distinctive from the rendering of non-encoded content.

The display component 116 can receive the encoded content as output by the encoder component 114 and the renderer component 202. The display component 116 can cause encoded content to be displayed in a visually distinctive manner from the non-encoded content.

Thus, using the system 200, a tester need not analyze source HTML to ascertain whether or not a function call to an encoding algorithm is operating properly (e.g., is positioned properly and/or is bug-free). Instead, the tester can be provided with the web page which will appear as it would appear to an end user except for untrusted content that has been encoded by the encoder component 114 and the renderer component 202.

Figure 3:
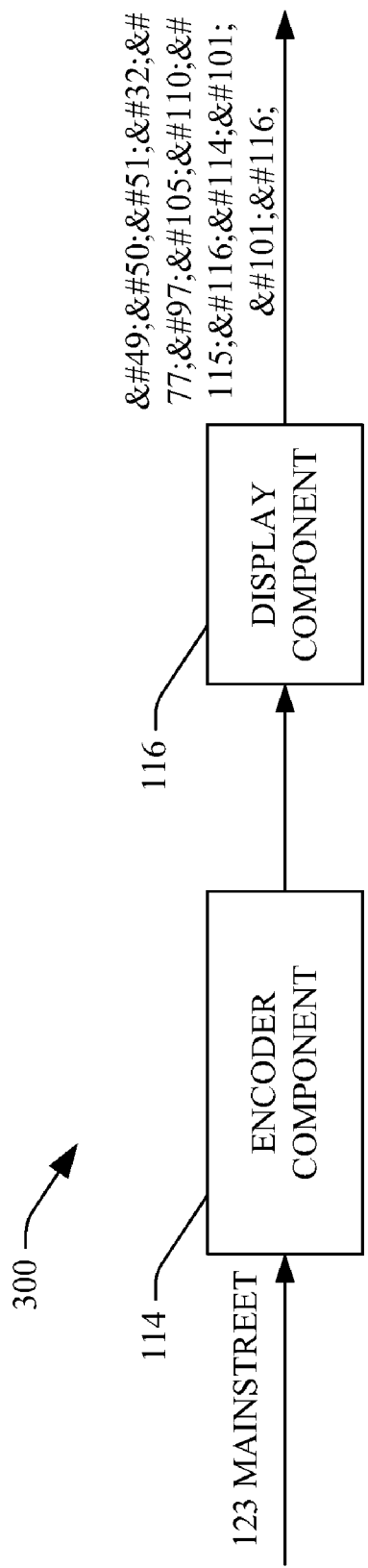
FIG. 3 illustrates an example encoding.

With reference now to FIG. 3, an example operation 300 of the encoder component 114 in conjunction with the display component 116 is illustrated. The encoder component 114 receives text "123 Main Street" as test content for a particular field of a web page, wherein the particular field of the web page is configured to receive user input that can be displayed a web page served to an end user. This text is received by the encoder component 114 and encoded thereby, wherein the encoder component 114 encodes each character of the test content by replacing each character with an ampersand symbol, a pound sign, an ASCII equivalent of each character, and a semicolon. Of course, the encoder component 114 can use other encoding schemes that cause encoded content to be displayed in a visually distinctive manner from non-encoded content in raw output of the encoder component 114. This raw output is received by the display component 116, which displays the encoded content upon receipt of a request to view the raw output by the tester. As can be discerned, "123 Main Street" is displayed as 123 Mainst reet by the display component 116.

Accordingly, the tester can quickly ascertain that a function call to the encoding algorithm pertaining to the field where the test content was entered is operating properly (e.g., has been positioned properly and is bug-free). In contrast, if such test content were to be used in a conventional approach, the tester would be unable to ascertain whether a function call to an encoding algorithm is properly positioned and operating properly. Rather, the tester would need to generate customized content for particular fields of a web page. To view the content output by the display component 116, the tester may use a browser and access source HTML through selection of one or more menu items. The web page itself as displayed in the browser may appear as no different than if no encoding had been undertaken (as the browser may include a decoding algorithm that allows content to be rendered in a suitable format).

Figure 4:
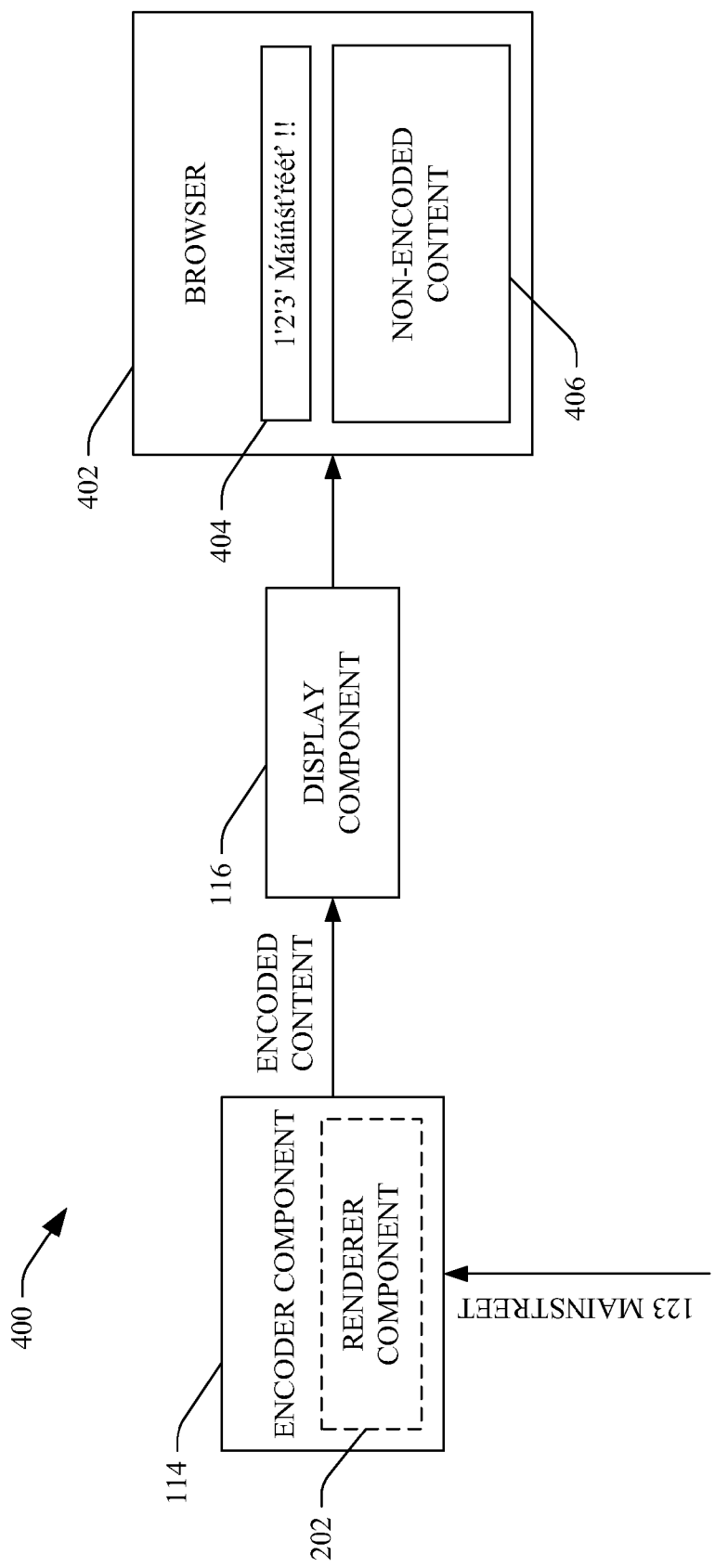
FIG. 4 illustrates an exemplary rendering of encoded content.

Now referring to FIG. 4, an example operation 400 of the encoder component 114 and the display component 116 is illustrated. As before, in this example, the encoder component 114 receives "123 Main Street" as test content for a particular field in a web page. The encoder component 114 may use any suitable encoding scheme when encoding the test content. For instance, the encoder component 114 may use the encoding scheme described above with respect to FIG. 3. Additionally, the encoder component 114 includes the renderer component 202 that causes encoding to be undertaken to cause encoded content to be displayed in a visually distinctive manner from non-encoded content in a web page. The display component 116 can then cause encoded content to be displayed in a visually distinctive manner from non-encoded content.

For example, the display component 116 may cause a browser 402 to display a first field 404 that corresponds to the test content provided to the encoder component 114. The renderer component 202 may be configured, for instance, to encode test content such that, when displayed, each character in the field 404 is visually modified. For instance, the renderer component 202 can encode the test content to cause glyphs to appear over characters displayed in the field 404 of the browser 402. The browser 402 can also display non-encoded content 406 which will appear as "normal" content to the tester. Thus, the tester need not view source HTML pertaining to a web page but instead can simply view the web page to ensure that displayed content corresponding to untrusted content (the test data) has been encoded by the encoder component 114 (and the renderer component 202). Thus, by reviewing the web page, the tester can confirm that a function call is operating properly with respect to a field corresponding to the test content (e.g., a field configured to receive untrusted content).

Figure 5:
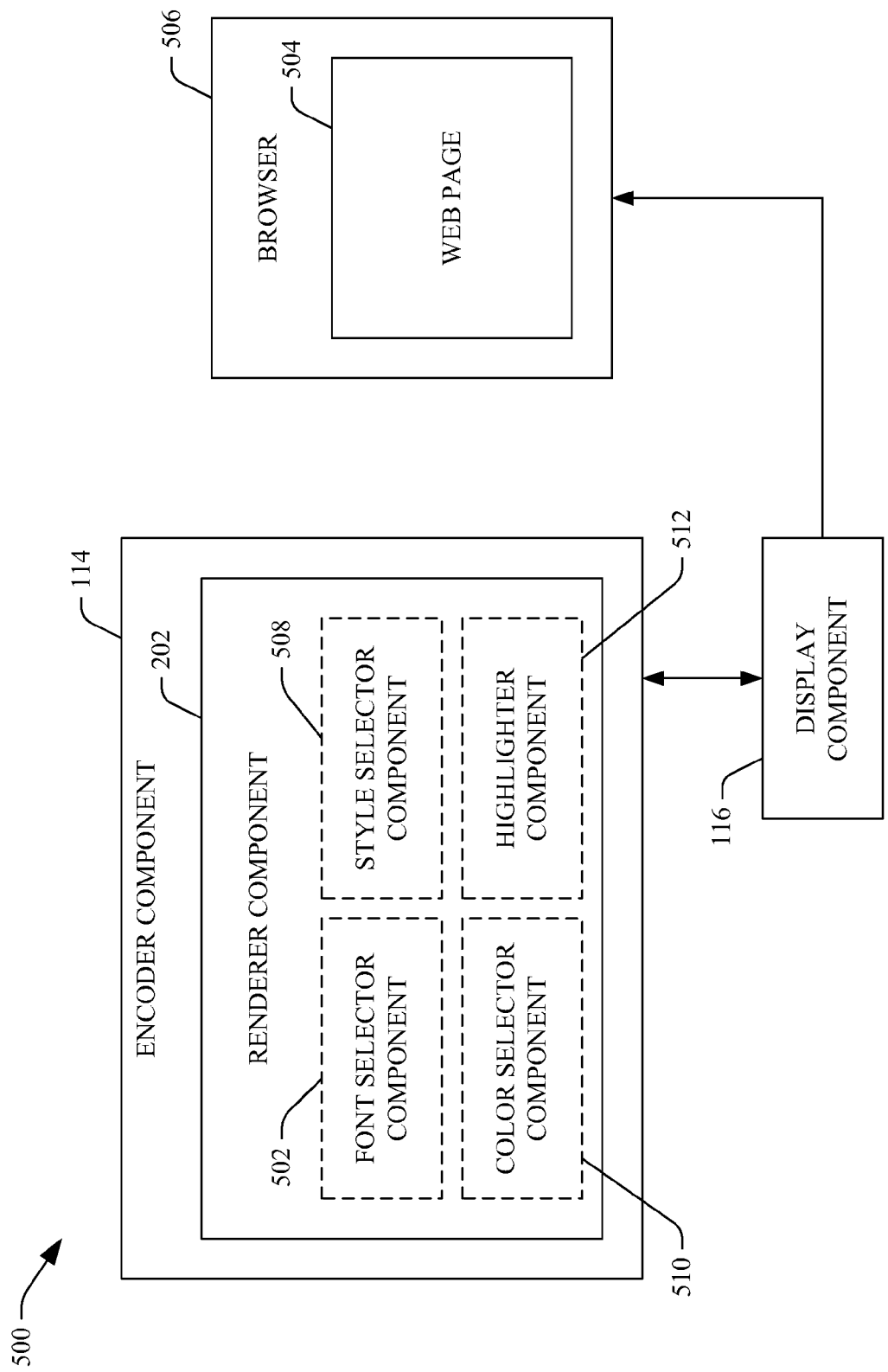
FIG. 5 is a functional block diagram of an example system that facilitates rendering test content in a browser.

Now referring to FIG. 5, an example system 500 that facilitates causing encoded content to be displayed in a visually distinctive manner from non-encoded content in a browser is illustrated. The system 500 includes the encoder component 114 which comprises the renderer component 202. As described above, the encoder component 114 and the renderer component 202 can be configured to receive test content that corresponds to a field of a web page where untrusted content will be entered when a corresponding web site goes online. In this example, the renderer component 202 may optionally include a font selector component 502. The font selector component 502 can be configured to cause text/characters to be encoded by the encoder component 114 such that such text/characters are displayed on a web page 504 in a browser 506 in a certain font. For instance, the font selector component 502 can select a font that causes encoded content to be displayed in a manner that is visually distinct from non-encoded content. The font selector component 502 can select a font intelligently: that is, the font selector component 502 can determine that the web page 504 to be rendered in the browser 506 includes text that is desirably shown in a certain font, and the font selector component 502 can cause encoded content to be displayed with a font that is visually distinctive from other fonts that are to be rendered on the web page 504. As noted above, the display component 116 can receive encoded content and non-encoded content and cause the encoded content to be displayed in a visually distinctive manner from the non-encoded content.

Additionally or alternatively, the renderer component 202 can include a style selector component 508 that can cause test content to be encoded such that encoded content is displayed with a certain style. A style can be or include italics, underlining, bolding, etc. Again, the style selector component 508 can intelligently select a style for which to display encoded content in the web page 504 to cause such encoded content to be visually distinctive from non-encoded content.

The renderer component 202 may further include a color selector component 510 that can cause text/characters to be encoded such that the text/characters are displayed in a certain color or colors in the web page 504. For instance, the color selector component 510 can select a color that encodes test content such that the test content is to be displayed in a manner that is visually distinctive from non-encoded content.

The renderer component 202 may additionally or alternatively include a highlighter component 512 that encodes test content such that the test content is to be displayed as highlighted in the web page 504. Again, the highlighter component 508 can select a highlight color/style that causes encoded content to be displayed in a manner that is visually distinctive from non-encoded content in the web page 504.

Furthermore, the font selector component 502, the style selector component 508, the color selector component 510 and/or the highlighter component 512 may act in conjunction to cause content to encoded such that encoded content is displayed in a visually distinctive manner from non-encoded content. Pursuant to an example, encoded content may be displayed with a particular font selected by the font selector component with a certain style as selected by the style selector component 508, the characters can be of a certain color as determined by the color selector component 510 and the encoded content can be highlighted in a manner determined by the highlighter component 508. Thus, the tester can view the web page 504 and quickly determine which content has been encoded and which content has not been encoded. If certain content (e.g., content that during on-line operation of a web-site corresponds to untrusted content) has not been encoded, the tester can quickly ascertain that a function call to an encoding algorithm is missing, misplaced, or is associated with some other bug.

Figure 6:
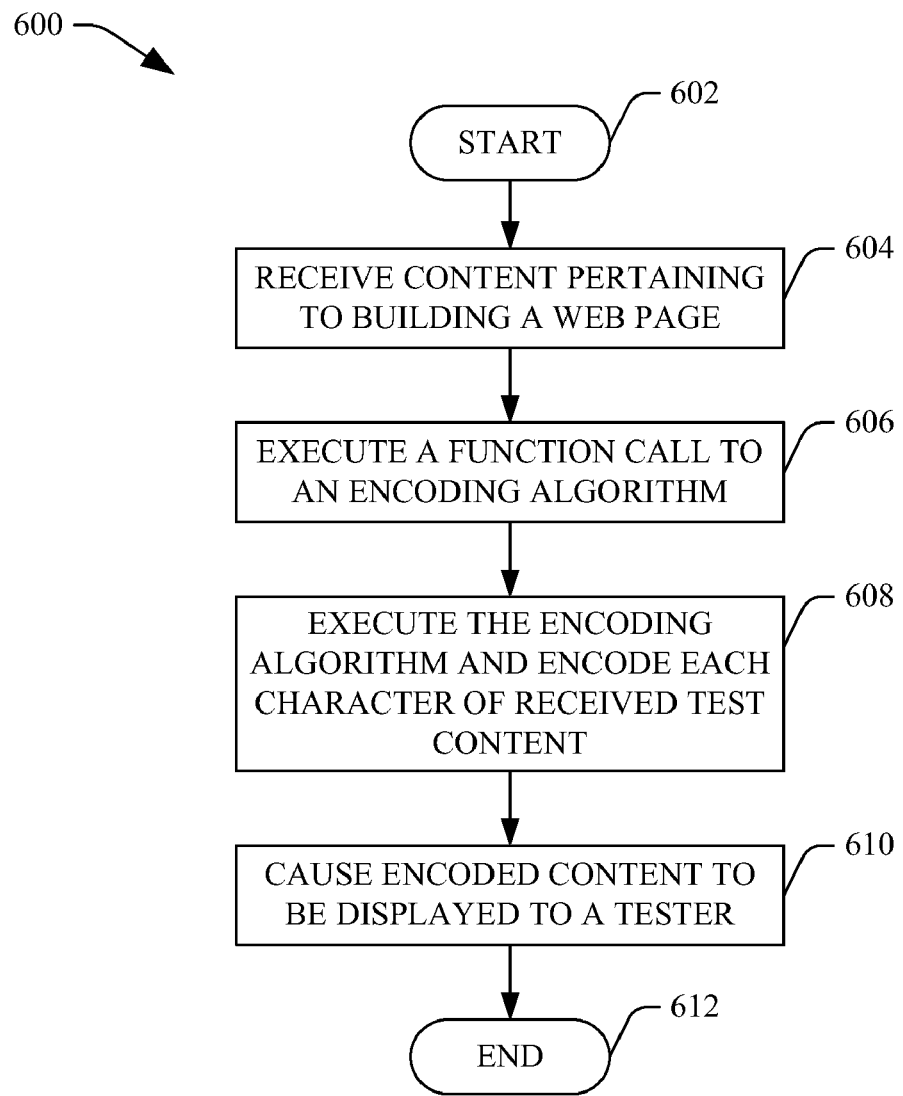
FIG. 6 is a flow diagram that illustrates an example methodology for displaying encoded test content to a tester.
Figure 7:
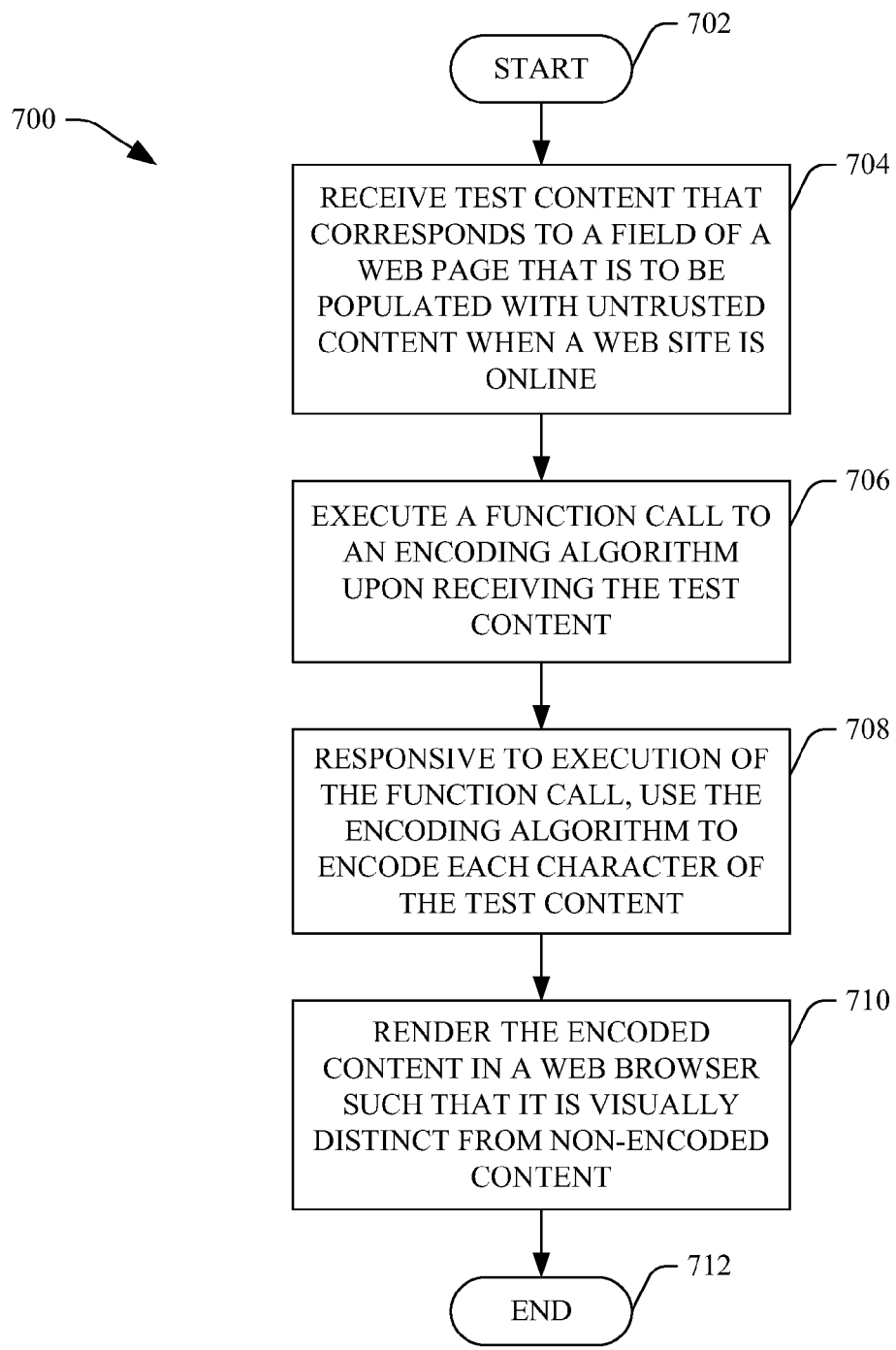
FIG. 7 is a flow diagram that illustrating an example methodology for rendering encoded content in a web browser such that the encoded content is visually distinctive from non-encoded content.

With reference now to FIGS. 6 and 7, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 6, a methodology 600 that facilitates causing encoded content to be displayed to a tester of a web site is illustrated. The methodology 600 begins at 602, and at 604 content pertaining to building a web page is received, wherein the content includes untrusted content (e.g., test content corresponding to user-generated data) and trusted content. For instance, the untrusted content can correspond to a field on a web page that is configured to accept user-generated data when the web site is online, wherein the user-generated data can be configured for display to another end user. For instance, such a field may be a content field of an e-mail, a field where web log entries can be generated, etc.

At 606, responsive to receipt of the content pertaining to building the web page, a function call to an encoding algorithm relating to the test content can be executed. The function call can call an encoding algorithm that desirably encodes each character of the test content. When the web site being tested goes online, the encoding algorithm can be replaced by an encoding algorithm that encodes possible malicious content.

At 608, responsive to execution of the function call, an encoding algorithm can be executed over at least a portion of the test content that corresponds to the function call. For instance, the encoding algorithm can be executed over test content that corresponds to a particular field of a web page. The portion of the test content that is subject to encoding by the encoding algorithm may include any suitable text/characters. For instance, the test content may include nonmalicious data. Furthermore, executing the encoding algorithm over the portion of the test content can cause each character in the portion of the test content to be encoded regardless of form or content of the portion of the test content. That is, the encoding algorithm does not search for particular characters to encode. Rather, the encoding algorithm encodes each character of the test content.

At 610, encoded content is caused to be displayed to a tester of the web site on a computer display screen. For instance, the encoded content can be displayed to the tester together with non-encoded content. The encoded content may be displayed to the tester in a manner that is visibly distinct from non-encoded content and also visibly distinct from the input test content. Pursuant to an example, the tester may view raw output of the encoding algorithm by selecting to view source HTML from a browser. When reviewing such source HTML, the tester can quickly ascertain which content has been encoded, as the encoded content is displayed in a manner that is visibly distinct from the non-encoded content.

In another example, encoded content may be displayed on a web page in a manner that is visibly distinct from non-encoded content. As noted above, the test content encoded by the encoding algorithm may include an HTML tag, data to be placed in an HTML attribute, data to be placed in a JavaScript string literal, etc. Furthermore, while the methodology 600 is described in connection with testing of a web site, it is to be understood that the methodology 600 may be modified, for instance, for use in connection with testing URLs. The methodology 600 completes at 612.

Turning now to FIG. 7, an example methodology 700 for execution during a testing stage for a web site is illustrated. The methodology 700 starts at 702, and at 704, content pertaining to building a web page is received, wherein the content includes trusted and untrusted content. In this example, the untrusted content can be test content provided by a tester, wherein the test content corresponds to a data entry field on a web page. The field of the web page can be configured for receipt of user-generated content (untrusted content) when the web site is online.

At 706, a function call to an encoding algorithm is executed in response to receiving the content pertaining to building the web page. The encoding algorithm called by the function call may be a special encoding algorithm for use during a testing phase of a web site and may be replaced when the web site goes online by a different encoding algorithm (e.g., an encoding algorithm that searches for particular characters or combinations of characters in untrusted content).

At 708, responsive to execution of the function call, the encoding algorithm is used to encode each character in the test content, thereby generating encoded content. As noted above, the test content may include any suitable data including an alphabetical character, a numerical character, etc. Furthermore, the test content may represent contents of an image or any other content that may be uploaded by a user for display to another user on a web site.

At 710, the encoded content is rendered in a web browser such that the encoded content is visually distinctive from non-encoded content in the web page. For instance, during encoding, the untrusted content may be encoded in such a way that encoded content is displayed on a web page as having glyphs over each character. In another example, the encoded content may have a particular font, style, color, etc. that causes such encoded content to be visibly distinct from non-encoded content. The tester therefore, can quickly ascertain which portions of the test content have been encoded and can quickly ascertain whether a function call to an encoding algorithm is executing properly, is misplaced, or has a bug. The methodology 700 completes at 712.

Figure 8:
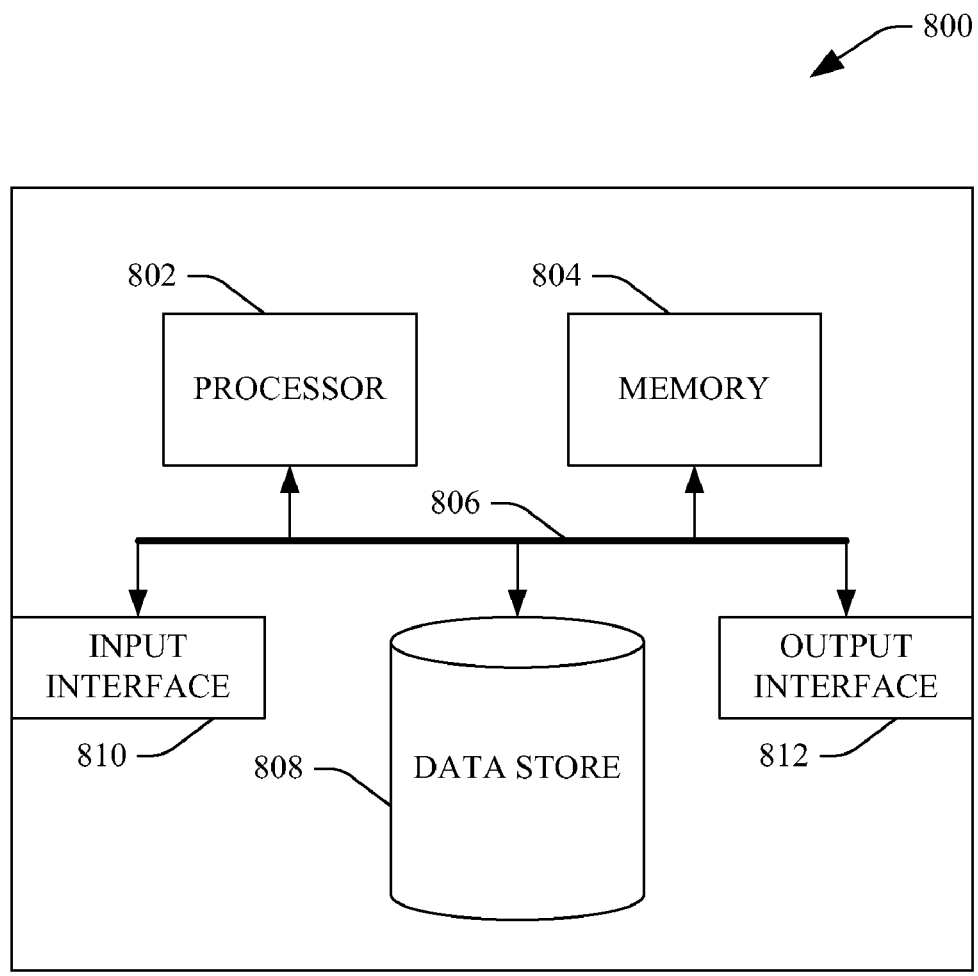
FIG. 8 is an example computing system.

Now referring to FIG. 8, a high-level illustration of an example computing device 800 that can be used in accordance with the systems and methodologies disclosed herein is illustrated. For instance, the computing device 800 may be used in a system that supports automatically encoding each character of test content. In another example, at least a portion of the computing device 800 may be used in a system that supports rendering encoded content in a web browser in a visible distinct manner from non-encoded content. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store test content, styles, colors, etc.

The computing device 800 additionally includes a data store 808 that is accessible by the processor 802 by way of the system bus 806. The data store 808 may include executable instructions, test content, web pages, encoding algorithms, etc. The computing device 800 also includes an input interface 810 that allows external devices to communicate with the computing device 800. For instance, the input interface 810 may be used to receive instructions from an external computer device, from a tester of a web site, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   during a testing phase of a web site, and prior to the web site going online, receiving test content to be displayed on a web page pertaining to the website, the test content received in a text entry field of the web page;
   responsive to receipt of the test content, executing a function call to an encoding algorithm, the function call corresponding to the text entry field of the web page;
   responsive to execution of the function call, executing the encoding algorithm over the test content, wherein the test content includes non-malicious data, and wherein executing the encoding algorithm causes at least one of an uppercase alphabetical character, at least one lowercase alphabetical character, and/or at least one numerical character in the test content to be encoded to generate encoded content; and
   causing the encoded content to be displayed to a tester of the web site on a computer display screen, wherein the encoded content is visibly distinct from non-encoded content, and wherein the encoded content is indicative to the tester of the web site that the function call corresponding to the text entry field of the web page is free of a bug.

2. The method of claim 1, wherein executing the encoding algorithm on the test content transforms the test content from a first visible form to a second visible form.

3. The method of claim 1, wherein the test content includes a Hyper Text Markup Language tag.

4. The method of claim 1, wherein the test content includes data to be placed in a Hyper Text Markup Language attribute.

5. The method of claim 1, wherein the test content includes data to be placed in a JavaScript string literal.

6. The method of claim 1, further comprising displaying the encoded content as raw output data from the encoding algorithm.

7. The method of claim 1, wherein the text entry field corresponds to an e-mail web site.

8. The method of claim 1, wherein the text entry field corresponds to a web log web site.

9. The method of claim 1, further comprising causing the encoded content to be rendered in the web page such that the encoded content is visually distinctive from non-encoded content.

10. The method of claim 9, wherein the encoded content is displayed with glyphs over each character in the web page.

11. The method of claim 9, wherein the encoded content is displayed with a font that causes the encoded content to be visually distinctive from non-encoded content.

12. The method of claim 11, wherein the encoded content is displayed with a style that causes the encoded content to be visually distinctive from non-encoded content.

13. The method of claim 9, wherein the encoded content is highlighted in the web page.

14. A system that, during a testing phase of a web site that receives and transmits untrusted content, and prior to the web site going online, facilitates detecting security flaws in the web site, the system comprising:
- a processor; and
- a memory that comprises a plurality of components that are executed by the processor, the plurality of components comprising:
  - a receiver component that receives test content that corresponds to a text entry field on a web page that, when online, is configured to receive user-generated content, wherein the test content includes non-malicious data;
  - an encoder component that encodes each character of the test content regardless of form or content of the test content to generate encoded content, wherein the encoder component encodes each character of the test content responsive to a function call to the encoder component being executed, the function call corresponding to the text entry field of the web page; and
  - a display component that displays encoded content and non-encoded content of the web page to a tester on a computer screen, wherein the display component causes the encoded content to be displayed in a visually distinct manner from the non-encoded content to indicate that the function call is free of a bug.

15. The system of claim 14, wherein the display component causes the encoded content to be displayed on the computer screen responsive to receipt of a command from the tester to review source code of the web page.

16. The system of claim 14, wherein the display component causes the encoded content to be displayed in a visually distinct manner from the non-encoded content in a web browser.

17. The system of claim 16, wherein the encoder component comprises a color selector component that causes color of encoded content to be displayed in a certain color in the browser.

18. The system of claim 16, wherein the encoder component comprises a font selector component that causes the encoded content to be displayed in a certain font in the browser.

19. The system of claim 14, wherein the test content comprises data to be placed in a Uniform Resource Locator-encoded parameter.

20. A computer-readable data storage device comprising instructions that, when executed by a processor, perform the following acts:
- prior to a web site going online, in a testing phase pertaining to the web site that is configured to receive and transmit user-generated content when online, receiving content pertaining to building a web page that includes test content corresponding to a field of the web page that is to be populated by user-generated content when the web site is online;
- executing a function call upon receiving the content pertaining to building the web page, wherein the function call initiates an encoding algorithm, wherein the function call corresponds to the field of the web page that is to be populated by user-generated content when the web site is online;
- responsive to execution of the function call, using the encoding algorithm to encode each character in the test content to generate encoded content, wherein the test content includes alphabetical characters; and
- rendering the encoded content in a web browser of a tester of the web site such that the encoded content is visually distinct from non-encoded content on the web page, wherein the rendering of the encoded content indicates to the tester of the web site that the function call is free of bugs.

* * * * *